(12) United States Patent
Bednarczyk et al.

(10) Patent No.: US 9,367,546 B2
(45) Date of Patent: Jun. 14, 2016

(54) METHOD AND APPARATUS FOR CUSTOMIZING SYNDICATED DATA FEEDS

(75) Inventors: William Ray Bednarczyk, Carmel, IN (US); Jayanta Majumdar, Irvine, CA (US); Koji Okamoto, Indianapolis, IN (US); Quan Liu, Carmel, IN (US); Joris Roussel, Paris (FR); Sylvain Chaillou, Boulogne Billancourt (FR)

(73) Assignee: Thomson Licensing, Boulogne-Billancourt (FR)

( * ) Notice: Subject to any disclaimer, the term of this patent is extended or adjusted under 35 U.S.C. 154(b) by 1422 days.

(21) Appl. No.: 12/448,580

(22) PCT Filed: Oct. 19, 2007

(86) PCT No.: PCT/US2007/022313
§ 371 (c)(1),
(2), (4) Date: Jun. 25, 2009

(87) PCT Pub. No.: WO2008/085219
PCT Pub. Date: Jul. 17, 2008

(65) Prior Publication Data
US 2010/0040209 A1 Feb. 18, 2010

Related U.S. Application Data

(60) Provisional application No. 60/878,969, filed on Jan. 5, 2007, provisional application No. 60/879,289, filed on Jan. 8, 2007.

(51) Int. Cl.
*G06F 21/00* (2013.01)
*G06F 15/16* (2006.01)
(Continued)

(52) U.S. Cl.
CPC .... *G06F 17/30053* (2013.01); *G06F 17/30044* (2013.01); *H04L 67/26* (2013.01); *H04L 67/325* (2013.01); *G06F 21/10* (2013.01)

(58) Field of Classification Search
CPC .................. G06F 17/30053; G06F 17/30044; G06F 21/10
USPC ..................... 707/3; 705/2, 51; 709/231, 217; 379/88.17; 455/414.3, 466
See application file for complete search history.

(56) References Cited

U.S. PATENT DOCUMENTS 6,161,143 A 12/2000 Tayama et al.
7,581,166 B2 * 8/2009 Renger et al. ................. 715/201
(Continued)

FOREIGN PATENT DOCUMENTS

EP 1777632 4/2007
JP 9-186788 7/1997
(Continued)

OTHER PUBLICATIONS

Storz et al.:"Supporting Content Scheduling on Situated Public Displays" Mobile Computing and Ambient Intelligence, Computer & Graphics, 2006, pp. 681-691, XP005713033.
(Continued)

*Primary Examiner* — Lisa Hashem
(74) *Attorney, Agent, or Firm* — Robert D. Shedd; Reitseng Lin

(57) ABSTRACT

A method and apparatus enables customized receipt of syndicated data feeds according to designated time periods. According to an exemplary embodiment, the method includes the steps of enabling a user to select a first syndicated data feed to be received by a first device during a first time period, and enabling the user to select a second syndicated data feed to be received by a second device during a second time period different from the first time period.

17 Claims, 6 Drawing Sheets

(51) Int. Cl.
  *G06F 17/30* (2006.01)
  *H04L 29/08* (2006.01)
  *G06F 21/10* (2013.01)

(56) References Cited

U.S. PATENT DOCUMENTS

| | | | |
|---|---|---|---|
| 7,822,868 B2* | 10/2010 | Gassewitz et al. | 709/231 |
| 8,700,738 B2* | 4/2014 | Moore et al. | 709/219 |
| 2005/0188078 A1 | 8/2005 | Kotzin et al. | |
| 2006/0033950 A1 | 2/2006 | Nakamura | |
| 2006/0155698 A1 | 7/2006 | Vayssiere | |
| 2006/0161635 A1* | 7/2006 | Lamkin et al. | 709/217 |
| 2006/0217126 A1 | 9/2006 | Sohm et al. | |
| 2006/0230061 A1 | 10/2006 | Sample et al. | |
| 2006/0240856 A1 | 10/2006 | Counts et al. | |
| 2006/0277291 A1 | 12/2006 | Misbach | |
| 2006/0282822 A1 | 12/2006 | Weng | |
| 2006/0288329 A1 | 12/2006 | Gandhi et al. | |
| 2007/0083894 A1 | 4/2007 | Gonsalves et al. | |
| 2007/0094156 A1 | 4/2007 | Isaacs | |
| 2007/0094321 A1 | 4/2007 | Nussey et al. | |
| 2007/0100836 A1* | 5/2007 | Eichstaedt et al. | 707/10 |
| 2007/0100960 A1 | 5/2007 | Eichstaedt et al. | |
| 2007/0265857 A1* | 11/2007 | Shivaji Rao | 705/1 |
| 2008/0155112 A1* | 6/2008 | Ma et al. | 709/231 |
| 2010/0138753 A1* | 6/2010 | Riggs et al. | 715/745 |
| 2010/0184456 A1* | 7/2010 | Teppo et al. | 455/466 |
| 2011/0106967 A1* | 5/2011 | Bellessort et al. | 709/231 |
| 2012/0284422 A1* | 11/2012 | Jones et al. | 709/231 |
| 2013/0012180 A1* | 1/2013 | Backholm et al. | 455/418 |
| 2013/0053142 A1* | 2/2013 | Kress et al. | 463/31 |
| 2013/0227078 A1* | 8/2013 | Wei | H04L 67/02 709/219 |
| 2014/0098715 A1* | 4/2014 | Morsy et al. | 370/260 |
| 2014/0245334 A1* | 8/2014 | Belyaev et al. | 725/9 |
| 2014/0317133 A1* | 10/2014 | Renger et al. | 707/756 |
| 2015/0007020 A1* | 1/2015 | Tiu, Jr. | G06F 17/30867 715/234 |
| 2015/0142582 A1* | 5/2015 | Vonarburg | G06F 17/30861 705/14.66 |
| 2015/0169559 A1* | 6/2015 | Gossweiler, III | G06F 17/30017 707/752 |
| 2015/0180944 A1* | 6/2015 | Simpson | H04L 69/04 709/203 |
| 2015/0348106 A1* | 12/2015 | Yao | G06Q 30/0256 705/14.54 |
| 2016/0026651 A1* | 1/2016 | Wetherell | G06F 17/3089 715/739 |

FOREIGN PATENT DOCUMENTS

| | | |
|---|---|---|
| JP | 11-196091 | 7/1999 |
| JP | 2000-69199 | 3/2000 |
| JP | 2001-326754 | 11/2001 |
| JP | 2002268968 | 9/2002 |
| JP | 2002297191 | 10/2002 |
| JP | 2004-56666 | 2/2004 |
| JP | 2005-236912 | 9/2005 |
| JP | 2006-54732 | 2/2006 |
| JP | 2006-244430 | 9/2006 |
| JP | 2006-285941 | 10/2006 |
| JP | 2007-334494 | 12/2007 |

OTHER PUBLICATIONS

Chmielewski et al.:"A Distributed Platform for Archiving and Retrieving RSS Feeds", Proceedings of the Fourth Annual ACIS International Conference on Computer and Information Science, 2005, IEEE.
Reusch et al.:"New Communication Concepts Based upon Advanced RSS Feeds", IEEE Workshop on Intelligent Data Acquissition and Advanced Computing Systems, Technology and applications, Sep. 5-7, 2005, Sofia, Bulgaria, pp. 699-702.
International Search Report dated Apr. 23, 2008.
Zhou et al.: A Self-Organizing Engine for RSS Syndicated Web Contents Proceedings of 22nd Intternational Conference on Data Engineering Workshops IEEE 2006.

* cited by examiner

Each HS will have its own tab and selection screen.

| ADVANCED Handset 3 | ADVANCED Handset 4 | ADVANCED Handset 5 |
|---|---|---|

| Channel 3 ▼ | Channel 4 ▼ | Channel 5 ▼ | Channel 6 ▼ | |
|---|---|---|---|---|
| Traffic | On This Day | Custom | Calender | 12:00 AM |
| | | | | 1:00 AM |
| | | | | 2:00 AM |
| | | | | 3:00 AM |
| | | | | 4:00 AM |
| | | | | 5:00 AM |
| | | | | 6:00 AM |
| | | | | 7:00 AM |
| | | | | 8:00 AM |
| | | | | 9:00 AM |
| | | | | 10:00 AM |
| | | | | 11:00 AM |
| | | | | 12:00 PM |
| | | | | 1:00 PM |
| | | | | 2:00 PM |
| Sports | BBC News | National Terror Alerts | | 3:00 PM |
| | | | | 4:00 PM |
| | | | | 5:00 PM |
| | | | | 6:00 PM |
| | | | | 7:00 PM |
| | | | | 8:00 PM |
| | | | | 9:00 PM |
| | | | | 10:00 PM |
| | | | | 11:00 PM |

To FIG. 5A

Submit | Reset

FIG. 5B

METHOD AND APPARATUS FOR CUSTOMIZING SYNDICATED DATA FEEDS

CROSS REFERENCE TO RELATED APPLICATIONS

This application claims the benefit, under 35 U.S.C. §365 of International Application PCT/US2007/022313 filed Oct. 19, 2007, which was published in accordance with PCT Article 21(2) on Jul. 17, 2008 in English and which claims the benefit of U.S. provisional patent application No. 60/878,969 filed Jan. 5, 2007 and U.S. provisional application No. 60/879,289 filed Jan. 8, 2007.

BACKGROUND OF THE INVENTION

1. Field of the Invention

The present invention generally relates to apparatuses capable of receiving syndicated data feeds, and more particularly, to a method and apparatus for enabling customized receipt of syndicated data feeds according to designated time periods.

2. Background Information

Certain devices and apparatuses having access to networks such as the internet may be capable of receiving syndicated data feeds. One type of syndicated data feed is known as a Real Simple Syndication (RSS) data feed. In general, RSS represents a family of web feed formats that may be used to publish frequently updated content such as news headlines, podcasts and blog entries. An RSS data feed (also known as an RSS document) may contain a summary of content from an associated web site or a full text version of the content. Such data feeds have become increasingly popular with devices coupled to the internet.

Heretofore, the ability to customize the receipt of syndicated data feeds, such as RSS data feeds, by devices has been limited. Accordingly, there is need for a method and apparatus for enabling customized receipt of syndicated data feeds. The present invention described herein addresses this problem and enables, among other things, customized receipt of syndicated data feeds, such as RSS data feeds, according to designated time periods.

SUMMARY OF THE INVENTION

In accordance with an aspect of the present invention, a method is disclosed. According to an exemplary embodiment, the method comprises the steps of enabling a user to select a first syndicated data feed to be received by a first device during a first time period, and enabling the user to select a second syndicated data feed to be received by a second device during a second time period.

According to another exemplary embodiment, the method comprises the steps of enabling a user to select a first syndicated data feed to be received by a first device during a first time period, and enabling the user to select a second syndicated data feed to be received by the first device during a second time period different from the first time period.

In accordance with another aspect of the present invention, an apparatus is disclosed. According to an exemplary embodiment, the apparatus comprises means, such as a memory, for storing data to enable display of a user interface, and means, such as a processor, for enabling a user to select, via the user interface, a first syndicated data feed to be received by a first device during a first time period and a second syndicated data feed to be received by a second device during a second time period.

According to another exemplary embodiment, the apparatus comprises means, such as a processor, for enabling a user to select a first syndicated data feed to be received by the apparatus during a first time period and a second syndicated data feed to be received by the apparatus during a second time period different from the first time period, and means, such as a terminal, for receiving the first syndicated data feed during the first time period and the second syndicated data feed during the second time period.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

Figure 1:
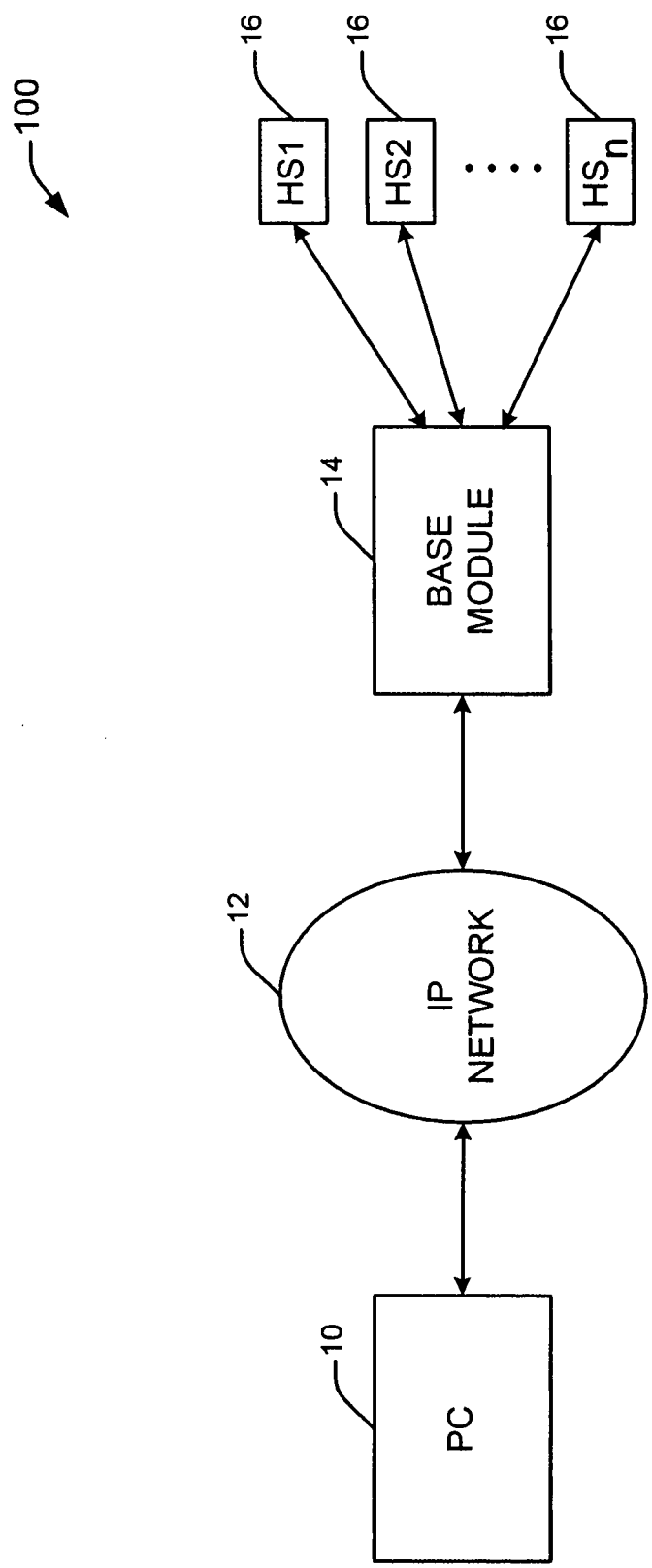
FIG. 1 is a block diagram of a system suitable for implementing the present invention.

Referring now to the drawings, and more particularly to FIG. 1, a block diagram of a system 100 suitable for implementing the present invention is shown. As indicated in FIG. 1, system 100 comprises a personal computer (PC) 10, an internet protocol (IP) network 12, a base module 14, and one or more handsets 16 (shown as HS1-HSn, where "n" is any integer). The architecture of system 100 is exemplary only, and is not intended to limit the present invention in any manner. According to principles of the present invention, the architecture of system 100 enables users to select syndicated data feeds, such as RSS data feeds, to be received by PC 10, base module 14 and/or one or more handsets 16 according to designated time periods.

In FIG. 1, PC 10 is operatively coupled to base module 14 via IP network 12. Base module 14 represents a base station of a cordless telephone system having wireless communication with one or more associated handsets 16. According to an exemplary embodiment, a user at one of the devices shown in FIG. 1 may select syndicated data feeds to be received by one or more other devices according to designated time periods. For example, a user at PC 10 may select a first syndicated data feed to be received by a first handset 16 (e.g., HS1) during a first time period, and select a second syndicated data feed to be received by the first handset 16 (e.g., HS1) and/or a second handset 16, (e.g., HS2) during a second time period different from the first time period. If the second syndicated data feed is selected for the second handset, the second time period can be the same or overlap a part or all of the first time period.

According to another exemplary embodiment, a user at one of the devices shown in FIG. 1 may select syndicated data feeds to be received by that same device according to designated time periods. For example, a user at PC 10 may select a first syndicated data feed to be received by PC 10 during a first time period, and select a second syndicated data feed to be received by PC 10 during a second time period different from the first time period. As another example, a user at one of the handsets 16 (e.g., HS1) may select a first syndicated data feed to be received by that same handset 16 (e.g. HS1) during a first time period, and select a second syndicated data feed to be received by that same handset 16 (e.g., HS1) during a second time period different from the first time period. Other examples than those expressly described herein may also be contemplated by those skilled in the art, and fall within the scope of the present invention.

Figure 2:
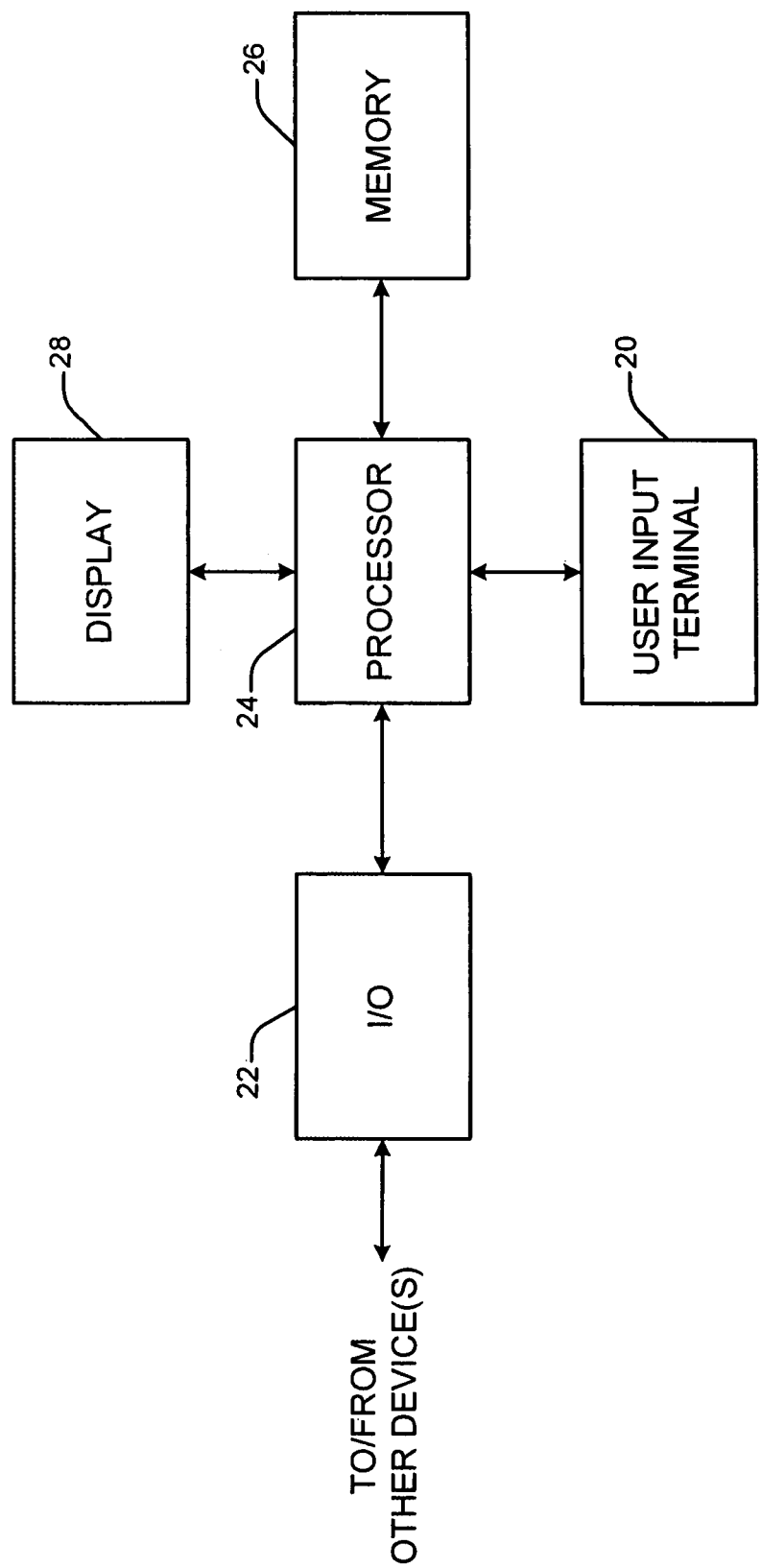
FIG. 2 is a block diagram of a relevant portion of an apparatus suitable for implementing the present invention.

Referring now to FIG. 2, a block diagram of a relevant portion of an apparatus suitable for implementing the present invention is shown. According to an exemplary embodiment, the portion of the apparatus shown in FIG. 2 may be part of PC 10, base module 14 and/or one or more of the handsets 16 shown in FIG. 1. The portion of the apparatus shown in FIG. 2 may also be a part of another device not shown in FIG. 1. The terms "apparatus" and "device" may be used interchangeably herein. As indicated in FIG. 2, the apparatus comprises user input means such as user input terminal 20, input/output (I/O) means such as I/O terminal 22, processing means such as processor 24, data storage means such as memory 26 and visual I/O means such as display 28. Some of the foregoing elements of the apparatus may be implemented using one or more integrated circuits (ICs). For clarity of description, certain conventional elements associated with the apparatus such as certain control signals, power signals and/or other elements may not be shown in FIG. 2.

User input terminal 20 is operative to receive inputs from users, and to output signals corresponding to the user inputs to processor 24. According to an exemplary embodiment, user input terminal 20 may be implemented as a keypad having a plurality of keys including numeric, alphabetic, return/enter/confirmation, and/or directional arrow keys. User input terminal 20 may also include voice input capabilities. User input terminal 20 may for example be illuminated when in use (e.g., via light emitting diodes (LEDs) and/or other illumination means).

I/O terminal 22 is operative to perform I/O functions of the apparatus. According to an exemplary embodiment, I/O terminal 22 is operative to transmit signals to and receive signals from other devices, systems and/or apparatuses in one or more different networks. According to this exemplary embodiment, I/O terminal 22 is operative to receive and/or transmit user selected data feeds, such as RSS data feeds, during user selected time periods. I/O terminal 22 may include one or more antenna elements, plugs, and/or other types of I/O elements.

Processor 24 is operative to perform various signal processing and control functions of the apparatus. According to an exemplary embodiment, processor 14 is operative to execute software code that enables customized receipt of syndicated data feeds according to designated time periods. According to this exemplary embodiment, processor 14 enables users to select, via a user interface, syndicated data feeds, such as RSS data feeds, to be received by the apparatus and/or other devices during user selected time periods. Processor 24 is also operative to perform and/or enable functions of the apparatus including detecting and processing user inputs made via user input terminal 20, enabling the input and output of data via I/O terminal 22, reading and writing data from and to memory 26, enabling displays of user interfaces via display 28, and/or other functions.

Memory 26 is operative to perform data storage functions of the apparatus. According to an exemplary embodiment, memory 26 stores data including executable software code, data for enabling the display of user interfaces, user setup data corresponding to user input selections, and/or other data.

Display 28 is operative to provide visual displays under the control of processor 24. According to an exemplary embodiment, display 28 provides visual displays representing a user interface that enables customized receipt of syndicated data feeds according to designated time periods. Display 28 may also be implemented as a touch-screen. In such a case, display 28 may include touch icons that correspond to one or more keys of user input terminal 20.

Figure 3:
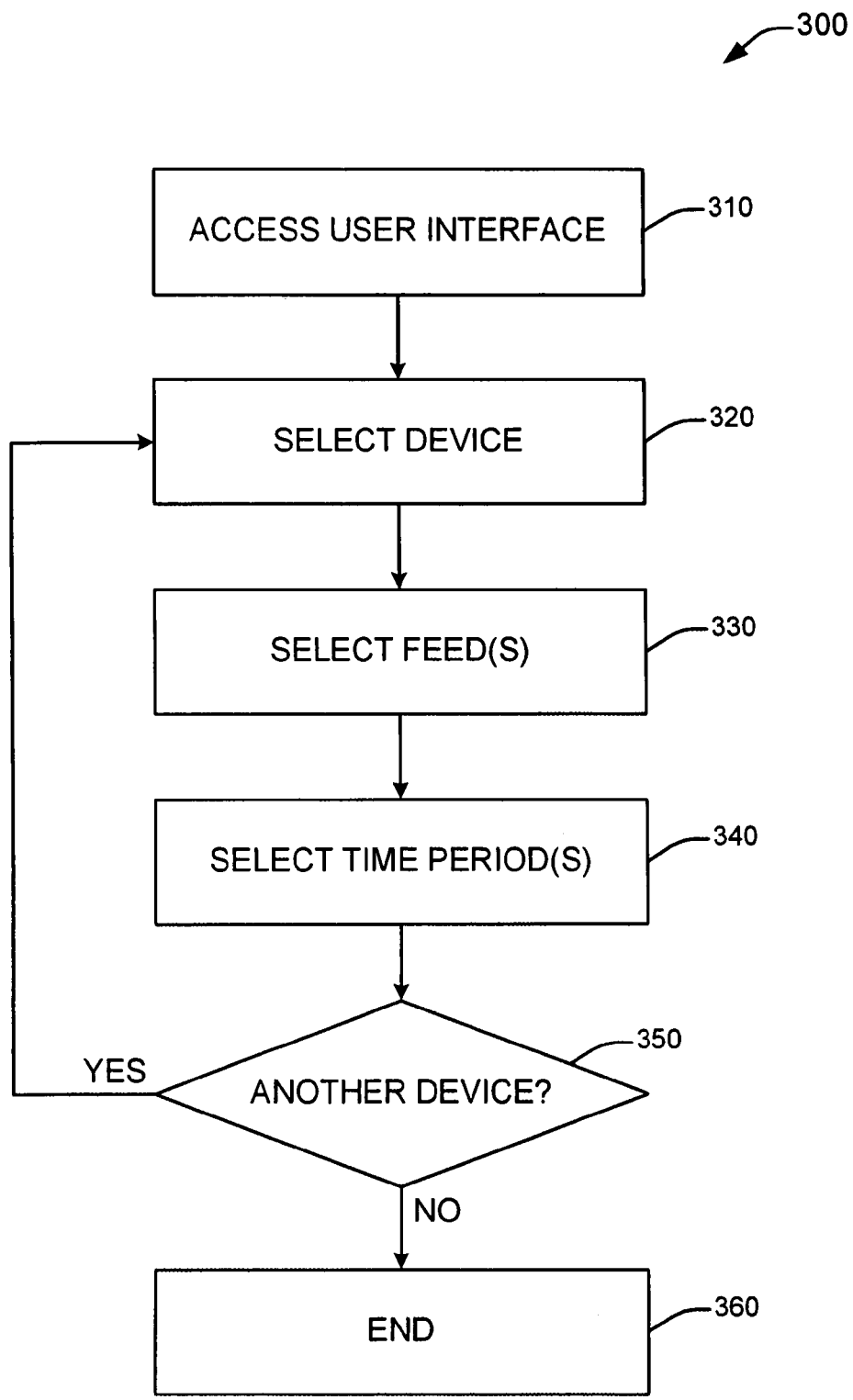
FIG. 3 is a flowchart illustrating steps according to an exemplary embodiment of the present invention.

Referring to FIG. 3, a flowchart illustrating steps according to an exemplary embodiment of the present invention is shown. For purposes of example and explanation, the steps of FIG. 3 will be described with reference to system 100 of FIG. 1 and the portion of the apparatus shown in FIG. 2. The steps of FIG. 3 are exemplary only, and are not intended to limit the present invention in any manner.

At step 310, a user interface is accessed by a user. According to an exemplary embodiment, the user interface is accessed at step 310 using the apparatus of FIG. 2 which may represent a part of PC 10, base module 14, one or more of the handsets 16 shown in FIG. 1, or a part of another device not shown in FIG. 1. According to this exemplary embodiment, the user may provide one or more predetermined inputs to the apparatus via user input terminal 20 which causes the user interface to be displayed via display 28 under the control of processor 24. As will be described later herein, the user interface accessed at step 310 may have different formats depending, for example, on the application in which the present invention is used. Accordingly, the exact type of user interface used in practice may be determined as a matter of design choice.

Figure 5A:
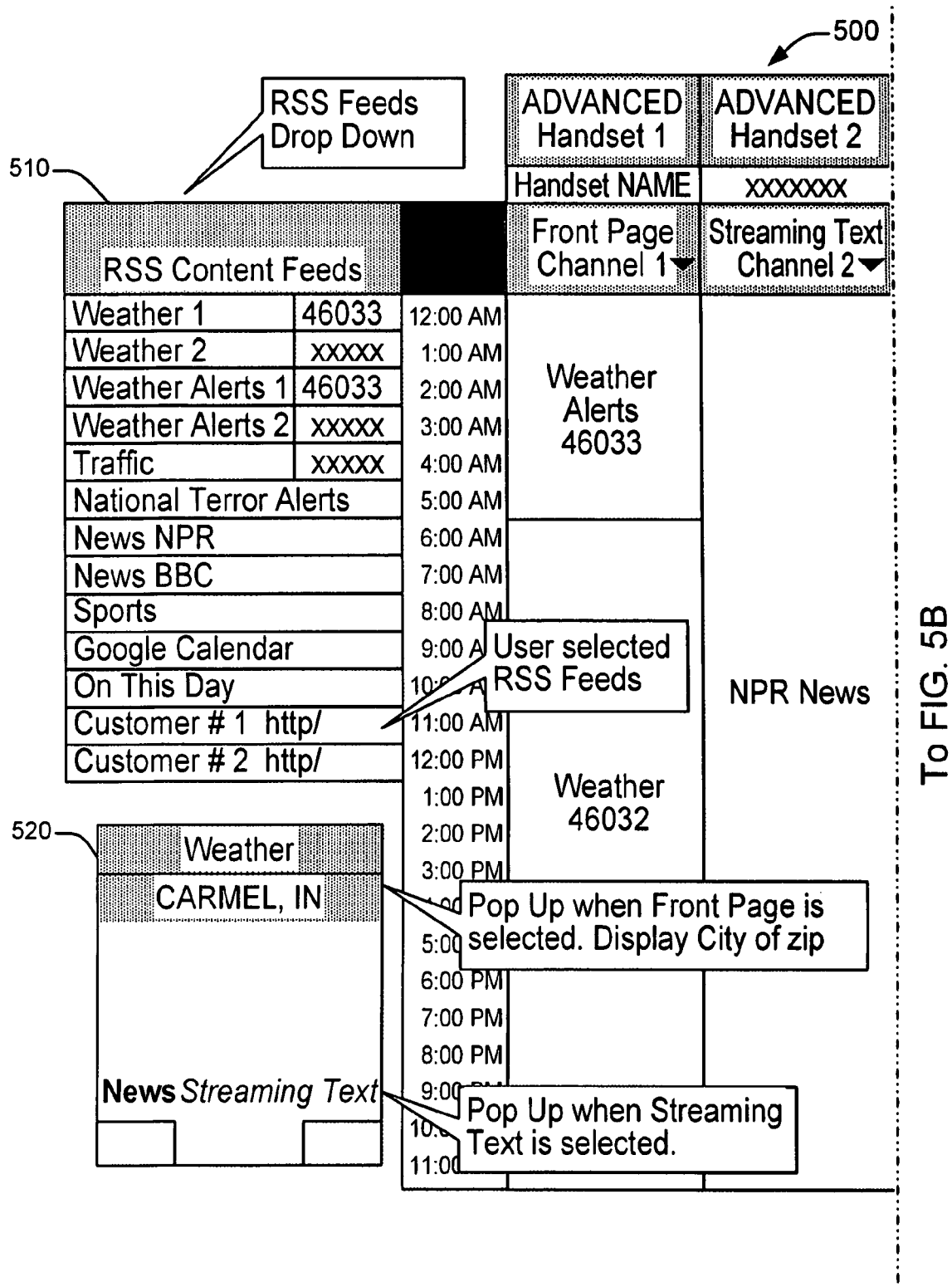
FIG. 5 is a diagram of another user interface according to an exemplary embodiment of the present invention.

At step 320, the user selects, via the user interface, a device that he/she wants to receive one or more syndicated data feeds during one or more designated time periods. According to an exemplary embodiment, the user provides one or more predetermined inputs to the apparatus via user input terminal 20 responsive to the user interface provided via display 28 to thereby select the device under the control of processor 24 at step 320. For example, the user interface may provide a list of various devices available for selection on one or more individual screens. FIG. 5 shows an exemplary user interface 500 which lists on a single screen various telephone handsets 16 (i.e., handsets HS1-HSn in FIG. 1) available for selection at step 320. Each of these handsets 16 may have its own tab and corresponding selection screen. User interface 500 may for example be provided via PC 10, base module 14, one of the handsets 16 shown in FIG. 1, or another device not shown in FIG. 1. In this manner, the user may select at step 320 (e.g., through highlighting, etc.) the particular device he/she wants to receive one or more syndicated data feeds during one or more designated time periods. The device selected at step 320 may be the device from which the user is working and the user interface is displayed (e.g., user at PC 10 selects PC 10, user at one handset 16 HSn selects handset 16 HSn, etc.), or a remote device (e.g., user at PC 10 selects one of the handsets 16 HSn, user at one of the handsets 16 HSn selects PC 10, etc.).

Figure 4:
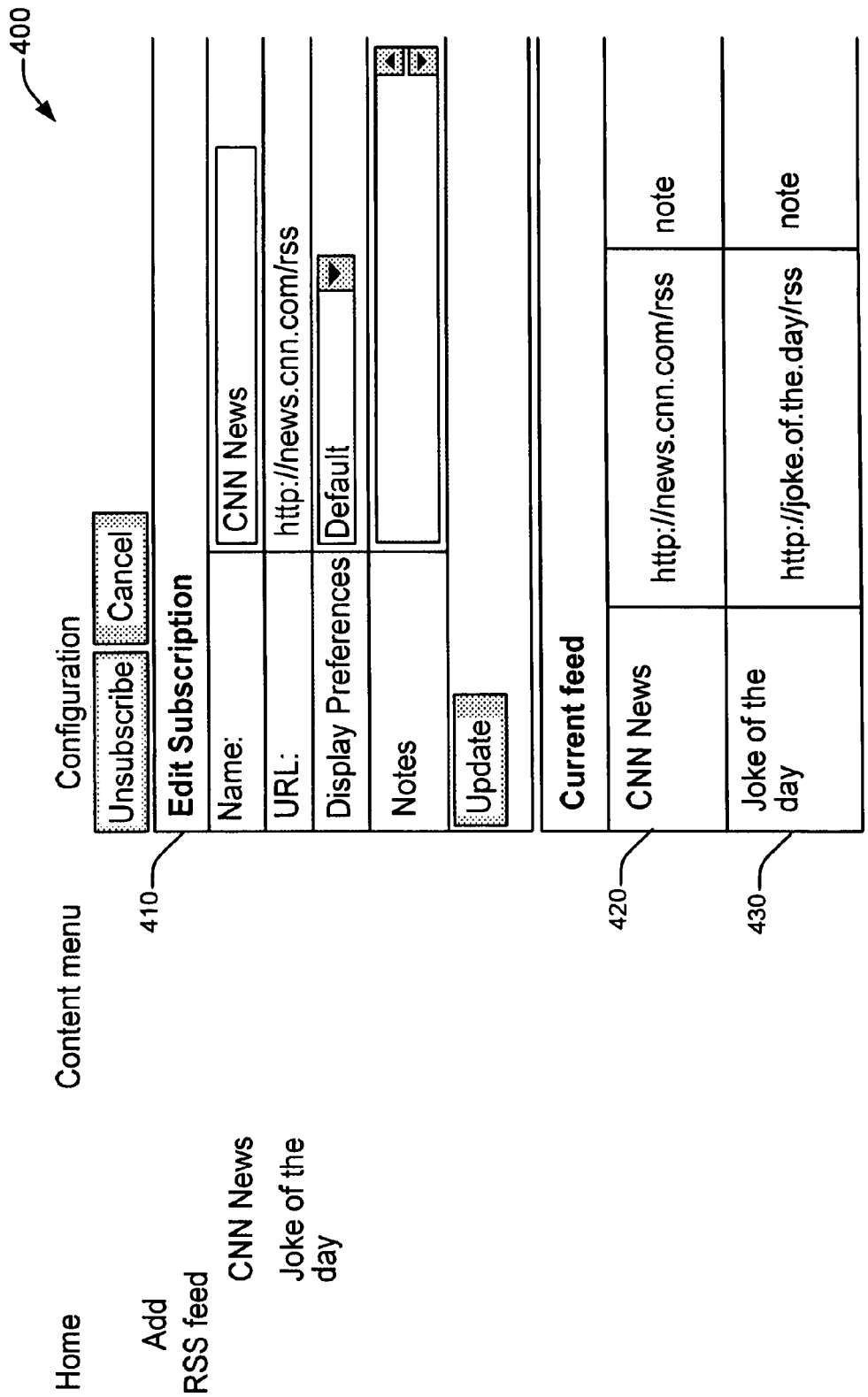
FIG. 4 is a diagram of a user interface according to an exemplary embodiment of the present invention.

At step 330, the user selects one or more syndicated data feeds he/she wants to be received by the device selected at step 320. According to an exemplary embodiment, the user provides one or more predetermined inputs to the apparatus via user input terminal 20 responsive to the user interface provided via display 28 to thereby select the one or more syndicated data feeds under the control of processor. 24 at step 330. For example, the user interface may provide means through which the user may select the one or more syndicated data feeds and/or edit previously selected data feeds. FIG. 4 shows an exemplary user interface 400 which provides a portion 410 through which the user may select the one or more syndicated data feeds and/or edit previously selected data feeds at step 330. As indicated in the exemplary user interface 400 of FIG. 4, the user has selected the syndicated data feeds "CNN News" and "Joke of the day" as represented by reference numbers 420 and 430, respectively. As another example, the user interface may provide a drop-down menu which lists various syndicated data feeds available for selection at step 330. The exemplary user interface 500 of FIG. 5, for example, provides drop-down menu 510 which lists various syndicated data feeds available for selection at step 330. Also indicated in FIG. 5, certain types of syndicated data feeds, such as weather and news-related data feeds may include a pop-up menu 520 that enables the user to select additional relevant information. For example, with weather and news-related data feeds, pop-up menu 520 may enable the user to select applicable geographical area(s) of interest and/or whether the data feed will be provided as streaming text.

At step 340, the user selects one or more time periods during which the device selected at step 320 will receive the one or more syndicated data feeds selected at step 330. According to an exemplary embodiment, the user may provide one or more predetermined inputs to the apparatus via user input terminal 20 responsive to the user interface provided via display 28 to thereby select the one or more time periods under the control of processor 24 at step 340. According to this exemplary embodiment, the user may select one or more time periods at step 340 for each syndicated data feed selected at step 330. The exemplary user interface 500 of FIG. 5, for example, provides a time bar 530 which indicates the respective time periods each selected data feed is selected for each selected device. For example, as indicated in FIG. 5, a second handset 16 (shown in FIG. 5 as Handset 2) is set up to receive the data feed "NPR News" as streaming text for the entire day. As another example in FIG. 5, a fourth handset 16 (shown in FIG. 5 as Handset 4) is set up to receive the data feed "On This Day" during the time period from 12:00 AM to 11:59 AM and the data feed "BBC News" during the time period from 12:00 PM to 11:59 PM.

In this embodiment, a user can select a time period by using the directional arrow keys in the user input terminal 20 to point to a desired starting time on the time bar 530 and select the desired starting time by pressing a confirmation key, and using the directional arrow keys again to point to a desired ending time and select the desired ending time by pressing the confirmation key again.

At step 350, the user has the option to select another device to receive one or more syndicated data feeds during one or more designated time periods. If the user decides "yes" at step 350, process flow loops back to step 320 where the user may select another device and the above-described steps are repeated. Alternatively, if the user decides "no" at step 350, process flow advances to step 360 where the process ends.

Data corresponding to the user selections at steps 320 to 340 is stored in a memory (e.g., memory 26) under the control of processor 24. According to an exemplary embodiment, the data is stored in memory in a location to enable the selected devices to receive the selected syndicated data feeds during the selected time periods. For example, if the user selects PC 10 to receive data feed(s) at step 320, data corresponding to the user selections at steps 320 to 340 may be stored in a memory of PC 10. As another example, if the user selects one of the handsets 16 to receive data feed(s) at step 320, data corresponding to the user selections at steps 320 to 340 may be stored in a memory of that specific handset 16 and/or a memory of base module 14. While the user selections at steps 320 to 340 of FIG. 3 are shown and described as being sequentially performed, it is noted that steps 320 to 340 may be performed in a concurrent and/or overlapping manner with a user interface, such as user interface 500 of FIG. 5. Accordingly, the steps of FIG. 3 are exemplary only, and are not intended to limit the present invention in any manner.

As described herein, the present invention provides a method and apparatus for enabling customized receipt of syndicated data feeds according to designated time periods. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method, comprising:
   enabling a user to select a first feed to be received by a first device during a first time period; and
   enabling said user to select a second feed to be received by a second device during a second time period, and wherein:
   said user selects said first and second feeds via a user interface provided by a third device;
   said user interface comprises a first axis and a second axis orthogonal to said first axis;
   said first axis lists a plurality of different time periods including said first and second time periods with said plurality of different time periods being sequentially arranged along said first axis in accordance with hours of a day;
   said second axis lists a plurality of different devices including said first and second devices with said plurality of different devices being sequentially arranged along said second axis such that each said device is listed in a separate column of said user interface; and
   for each said device listed along said second axis, said user interface displays a listing of one or more feeds scheduled for said device in accordance with said time periods listed along said first axis.

2. The method of claim 1, wherein said first and second feeds are Real Simple Syndication (RSS) data feeds.

3. The method of claim 1, wherein said first and second devices are telephone handsets.

4. An apparatus, comprising:
   a memory operative to store data to enable display of a user interface; and
   a processor operative to enable a user to select, via said user interface, a first feed to be received by a first device during a first time period and a second feed to be received by a second device during a second time period, and wherein:
   said user interface comprises a first axis and a second axis orthogonal to said first axis;
   said first axis lists a plurality of different time periods including said first and second time periods with said plurality of different time periods being sequentially arranged along said first axis in accordance with hours of a day;
   said second axis lists a plurality of different devices including said first and second devices with said plurality of different devices being sequentially arranged along said second axis such that each said device is listed in a separate column of said user interface; and for each said device listed along said second axis, said user interface displays a listing of one or more feeds scheduled for said device in accordance with said time periods listed along said first axis.

5. The apparatus of claim 4, wherein said first and second feeds are Real Simple Syndication (RSS) data feeds.

6. The apparatus of claim 4, wherein said first and second devices are telephone handsets.

7. The apparatus of claim 4, further comprising a terminal for outputting data corresponding to said user selections to a third device.

8. The apparatus of claim 4, wherein said user interface enables said user selection of said first and second feeds via a drop-down menu listing a plurality of feeds time-aligned with said plurality of different time periods listed along said first axis.

9. A method, comprising:

enabling a user to select a first feed to be received by a first device during a first time period; and enabling said user to select a second feed to be received by said first device during a second time period different from said first time period, and wherein:

said user selects said first and second feeds via a user interface provided by a second device;

said user interface comprises a first axis and a second axis orthogonal to said first axis;

said first axis lists a plurality of different time periods including said first and second time periods with said plurality of different time periods being sequentially arranged along said first axis in accordance with hours of a day;

said second axis lists a plurality of different devices including said first and second devices with said plurality of different devices being sequentially arranged along said second axis such that each said device is listed in a separate column of said user interface; and for each said device listed along said second axis, said user interface displays a listing of one or more feeds scheduled for said device in accordance with said time periods listed along said first axis.

10. The method of claim 9, wherein said first and second feeds are Real Simple Syndication (RSS) data feeds.

11. The method of claim 9, wherein said first device is one of a personal computer and a telephone handset.

12. The method of claim 9, wherein said user interface enables said user selection of said first and second feeds via a drop-down menu listing a plurality of feeds time-aligned with said plurality of different time periods listed along said first axis.

13. An apparatus, comprising:

a processor operative to enable a user to select a first feed to be received by said apparatus during a first time period and a second feed to be received by said apparatus during a second time period different from said first time period; and a terminal operative to receive said first feed during said first time period and said second feed during said second time period, and wherein:

said user selects said first and second feeds via a user interface provided by said apparatus;

said user interface comprises a first axis and a second axis orthogonal to said first axis;

said first axis lists a plurality of different time periods including said first and second time periods with said plurality of different time periods being sequentially arranged along said first axis in accordance with hours of a day;

said second axis lists a plurality of different devices including said apparatus with said plurality of different devices being sequentially arranged along said second axis such that each said device is listed in a separate column of said user interface; and for each said device listed along said second axis, said user interface displays a listing of one or more feeds scheduled for said device in accordance with said time periods listed along said first axis.

14. The apparatus of claim 13, wherein said first and second feeds are Real Simple Syndication (RSS) data feeds.

15. The apparatus of claim 13, wherein said apparatus is one of a personal computer and a telephone handset.

16. The method of claim 1, wherein said user interface enables said user selection of said first and second feeds via a drop-down menu listing a plurality of feeds time-aligned with said plurality of different time periods listed along said first axis.

17. The method of claim 13, wherein said user interface enables said user selection of said first and second feeds via a drop-down menu listing a plurality of feeds time-aligned with said plurality of different time periods listed along said first axis.

* * * * *